(12) United States Patent
Harvey

(10) Patent No.: US 9,680,355 B2
(45) Date of Patent: Jun. 13, 2017

(54) GROUNDING DEVICE FOR BRUSHLESS ELECTRIC MOTOR

(71) Applicant: Carter Fuel Systems, LLC, Cleveland, OH (US)

(72) Inventor: Richard W. Harvey, Logansport, IN (US)

(73) Assignee: Carter Fuel Systems, LLC, Cleveland, OH (US)

( * ) Notice: Subject to any disclaimer, the term of this patent is extended or adjusted under 35 U.S.C. 154(b) by 321 days.

(21) Appl. No.: 14/588,555

(22) Filed: Jan. 2, 2015

(65) Prior Publication Data

US 2015/0194864 A1    Jul. 9, 2015

Related U.S. Application Data

(60) Provisional application No. 61/923,302, filed on Jan. 3, 2014.

(51) Int. Cl.
*H02K 11/00*    (2016.01)
*F04D 13/06*    (2006.01)
(Continued)

(52) U.S. Cl.
CPC ........ *H02K 11/0089* (2013.01); *F04C 2/3445* (2013.01); *F04C 11/008* (2013.01);
(Continued)

(58) Field of Classification Search
CPC .. F04D 13/0606; F02M 37/048; H02K 5/225; H02K 11/33
(Continued)

(56) References Cited

U.S. PATENT DOCUMENTS 4,307,508 A * 12/1981 Anderson ................ H01H 9/02
29/596
4,798,984 A *  1/1989 Suzuki .................... H02K 11/40
310/239

(Continued)

FOREIGN PATENT DOCUMENTS

DE      3417266 A1   11/1985
DE     19943959 A1    3/2001
WO  2006/124934 A2   11/2006

OTHER PUBLICATIONS

International Preliminary Report on Patentability, dated Jul. 14, 2016, from related/corresponding PCT Patent Application Serial No. PCT/US15/10023, filed Jan. 2, 2015.
(Continued)

*Primary Examiner* — Hanh Nguyen
(74) *Attorney, Agent, or Firm* — Jones Day

(57) ABSTRACT

A motor includes a rotor assembly includes a rotor and a motor shaft secured to the rotor. The motor further includes stator coils. Circuitry of the motor includes electronic components that cooperatively operate to activate and deactivate the coils to cause the rotor assembly to rotate, and first and second power terminals. An electrically conductive outer housing surrounds the motor. An electrically conductive grounding tab is electrically connected to the first power terminal. The tab contacts a radially-inwardly facing surface of the outer housing to provide a electrostatic discharge path from the outer housing to the ground terminal.

23 Claims, 3 Drawing Sheets

(51) Int. Cl.
  *H02K 5/06*    (2006.01)
  *H02K 5/22*    (2006.01)
  *F04C 2/344*   (2006.01)
  *F04C 11/00*   (2006.01)
  *F04C 15/00*   (2006.01)
  *H02K 11/33*   (2016.01)
  *H02K 11/40*   (2016.01)
  *H02K 21/16*   (2006.01)

(52) U.S. Cl.
  CPC ........ *F04C 15/008* (2013.01); *F04D 13/0606* (2013.01); *H02K 5/06* (2013.01); *H02K 5/225* (2013.01); *H02K 11/33* (2016.01); *H02K 11/40* (2016.01); *F04C 15/0096* (2013.01); *F04C 2210/1044* (2013.01); *H02K 21/16* (2013.01)

(58) Field of Classification Search
  USPC .......................................................... 310/71
  See application file for complete search history.

(56) References Cited

U.S. PATENT DOCUMENTS

| | | | |
|---|---|---|---|
| 5,150,499 A | 9/1992 | Berfield | |
| 5,801,465 A * | 9/1998 | Yamada | H01R 13/523 174/77 R |
| 6,899,532 B2 * | 5/2005 | Eddy | H01R 13/5219 310/71 |
| 7,411,326 B2 | 8/2008 | Achor et al. | |
| 9,476,392 B2 * | 10/2016 | Talaski | F02M 37/048 |
| 2002/0190588 A1 | 12/2002 | Koenigs et al. | |
| 2006/0024176 A1 * | 2/2006 | Ikeya | F02M 37/048 417/366 |
| 2009/0160268 A1 * | 6/2009 | Ragnone | H01R 4/4809 310/51 |
| 2011/0285226 A1 * | 11/2011 | Fujita | H01L 23/49562 310/71 |
| 2013/0119799 A1 * | 5/2013 | Honda | H02K 11/0094 310/71 |

OTHER PUBLICATIONS

EPO Communication, enclosing extended search report, dated Sep. 9, 2016, from related/corresponding EPO Patent Application Serial No. 15733184.4, filed Jan. 2, 2015.

International Search Report and Written Opinion, dated Mar. 25, 2015, from related/corresponding PCT Patent Application Serial No. PCT/US15/10023, filed Jan. 2, 2015.

* cited by examiner

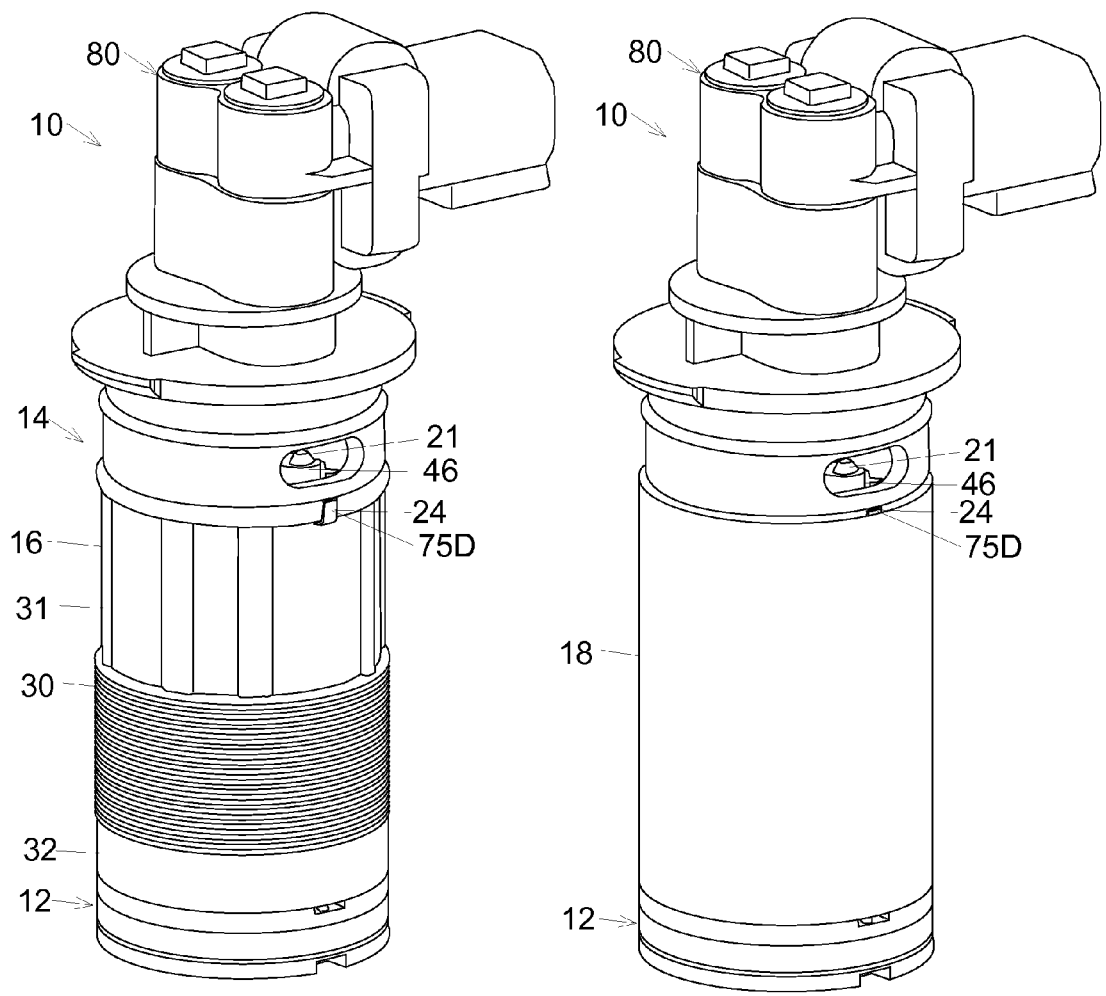

GROUNDING DEVICE FOR BRUSHLESS ELECTRIC MOTOR

CROSS-REFERENCE TO RELATED APPLICATION

This claims priority from U.S. Provisional Application No. 61/923,302, filed Jan. 3, 2014, hereby incorporated herein by reference.

TECHNICAL FIELD

This relates to reducing electrostatic discharge for a brushless direct current motor.

BACKGROUND

Brushless direct current (BLDC) motors typically have electronic controllers in the form of solid state circuits to facilitate operation of the BLDC motor. For example, metal-oxide-semiconductor field-effect transistors (MOSFET) are used to switch electronic signals within the motor, such as to switch power on and off to the BLDC motor's windings.

BLDC motors can be used in a variety of applications. One example is to drive (power) a fluid pump. Other examples are to drive (power) electric vehicles, motion control devices and positioning devices such as servomotors and linear motors.

SUMMARY

A motor includes a rotor assembly includes a rotor and a motor shaft secured to the rotor. The motor further includes stator coils. Circuitry of the motor includes electronic components that cooperatively operate to activate and deactivate the coils to cause the rotor assembly to rotate, and first and second power terminals. An electrically conductive outer housing surrounds the motor. An electrically conductive grounding tab is electrically connected to the first power terminal. The tab contacts a radially-inwardly facing surface of the outer housing to provide a electrostatic discharge path from the outer housing to the ground terminal.

In different examples, the grounding device might include a securing structure and a strip. The securing structure might receive the first terminal, and the strip might pressingly contact the inwardly-facing surface of the outer housing. The strip might include a proximal section that is coplanar with the securing structure and an upturned distal section that is perpendicular to the proximal section. The distal section might contact the inwardly-facing surface of the outer housing. The distal section might be upturned in a direction in which the housing is configured to slide when being slid over the motor to receive the motor.

BRIEF DESCRIPTION OF THE DRAWINGS

FIG. 7 is a perspective view showing the motor coupled to the grounding device and attached to a pump.

FIG. 8 is a view similar to FIG. 7, showing an outer housing encasing the motor and in contact with the grounding device.

DETAILED DESCRIPTION

Figure 1:
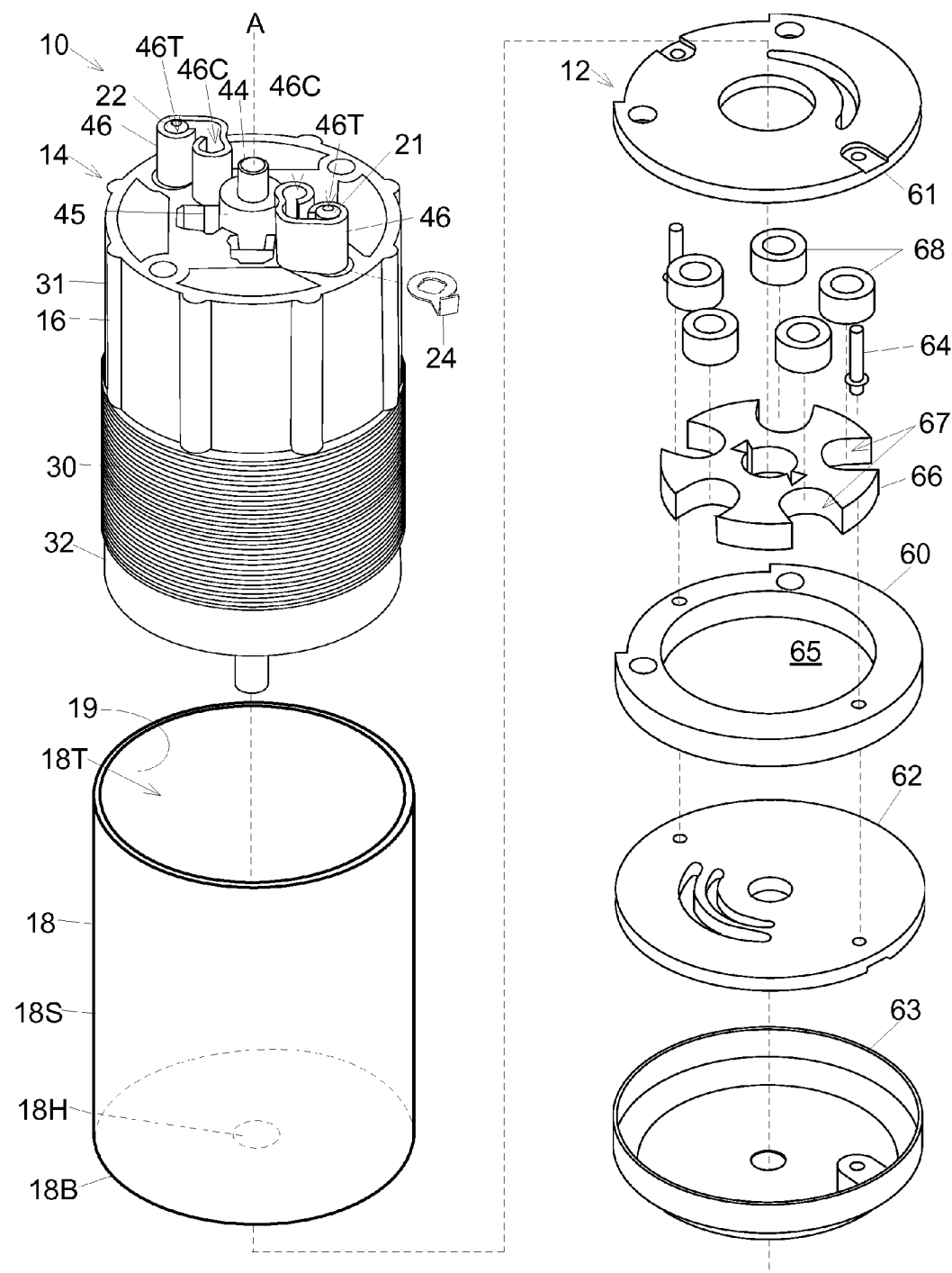
FIG. 1 is an exploded view of a pump assembly that includes a pump and a motor.

FIG. 1 is an exploded view of a pump assembly 10. The pump assembly 10 includes a fluid pump 12 that is attached to and driven (rotationally powered) by a motor assembly 14. The motor assembly 14 includes an electric motor 16 that is encased (enclosed) by an outer housing 18. The motor 16 receives electrical power through two electric terminals—in this example a ground terminal 21 and a supply terminal 22. A grounding device 24 is secured to the ground terminal 21 and contacts the outer housing 18 to ground the outer housing 18 by providing a conduction path from the outer housing 18 to the ground terminal 21. This grounding of the outer housing 18 helps protect the motor's components against electrostatic discharge (ESD).

Figure 2:
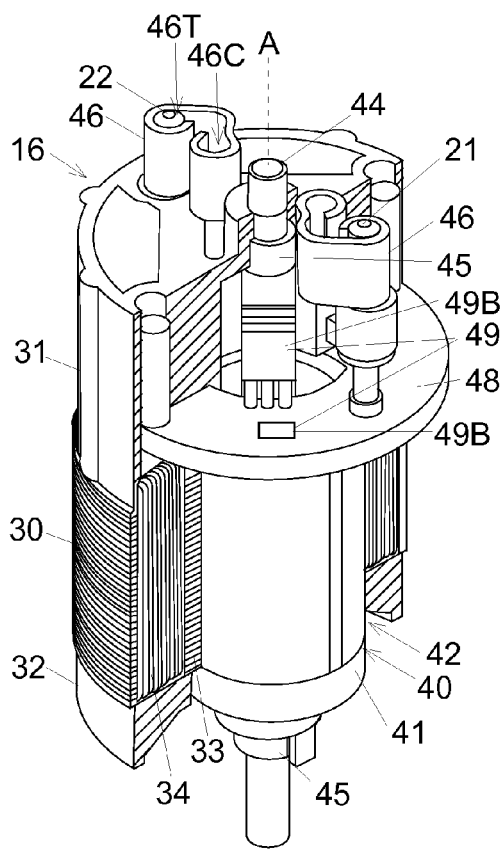
FIG. 2 is perspective sectional view of the motor.

The motor 16 is shown in FIG. 2. In this example, the motor 16 is a brushless direct current (BLDC) motor. The motor 16 includes the following components, described with reference to a rotational axis A: A stack of steel laminations 30 is sandwiched between an upper housing section 31 and a lower housing section 32. The laminations 30 include teeth 33 that project radially-inward toward the axis A. Stator coils 34 are wound about the teeth 33. A rotor assembly 40 includes a rotor 41. The rotor 41 in this example carries magnets and is located in a rotor cavity 42 within (defined by) the stack of laminations 30. The rotor assembly 40 further includes a rotor shaft 44 that is secured to the rotor 41 and is supported on rotor bearings 45. The bearings 45 enable the rotor 41 and the shaft 44 to rotate in unison about the rotational axis A. An upper section of the shaft 44 projects upward from the upper housing section 31. A lower section of the shaft 44 projects downward from the lower housing section 32.

The power terminals 21, 22 in this example are in the form of rigid posts that project rigidly upward from the upper housing section 31. The outer surface of each post may be of uninsulated bare metal. Each terminal 21, 22 is grasped by a jumper strap 46 (terminal clip). Each jumper strap 46 is formed from a length of steel strip (ribbon) that is bent to form two C-shaped sections—(1) a terminal-grasping section 46T that tightly grasps the respective power terminal 21 or 22 and a cable-grasping section 46C configured to tightly grasp a respective conductor of a mating power cable connector that is not specifically aligned with the terminals 21, 22.

The power terminals 21, 22 are electrically connected (coupled) to circuitry of a circuit board 48 to power the circuitry. Components 49 of the circuitry in this example include metal-oxide-semiconductor field-effect transistors 49A (MOSFETs, only one shown) that switch on and off (activate and deactivate) electrical power to the coils 34. The circuitry components further include electronic logic devices 49B that function cooperatively to control operation of the MOSFETs 49A. The FETs 49A and the logic devices 49B cooperatively operate to activate and deactivate the coils 34 in a timed manner configured to cause the rotor assembly 40 to rotate.

FIG. 1 shows the outer housing 18. In this example, the outer housing 18 encloses (encases) the motor 16. The outer housing 18 is formed from electrically conductive (such as electrostatic dissipative) material, for example steel or aluminum. The outer housing 18 is in the form of a can. The can 18 has a cylindrical side wall 18S that surrounds the motor 16 and a bottom wall 18B below the motor 16. The side wall 18 has a radially-inwardly facing surface 19. The bottom wall 18B has a hole 18H through which the motor shaft 44 extends. The can in this example lacks a top wall and instead has a top opening 18T. When assembling the pump assembly 10, the motor 16 is inserted (slid) downward into the can 18 through the can's top opening until the motor 16 reaches an installed position in the can 18. Equivalently, the can 18 is moved upward to receive the motor 16 through the can's top opening 18T until the can 18 reaches an installed position about the motor 16.

In this example, the fluid pump 12 is a fuel pump for pumping fuel into an engine or generator. The pump 12 includes the following components: A cam ring 60 is sandwiched between an outlet port plate 61 and an inlet port plate 62. A filter 63 removes debris from the fluid that is drawn in through the inlet port plate 62. Two posts 64 secure the port plates together tightly against the cam ring 60. The port plates 61, 62 and the cam ring 20 enclose and bound a pump chamber (cavity) 65. A rotor plate 66 is located within the pumping chamber 65. The pump's rotor plate 66 is secured to, and rotated by, the motor shaft 44. The rotor plate 66 has multiple (in this example five) pockets 67. Each pocket 67 retains a respective roller 68. The inlet port plate 62 encloses the pumping chamber 65. As the rotor plate 66 rotates, movement of the rollers 68 relative to the pockets 67 and the cam ring 60 displaces fluid. Fluid drawn in the filter 63 and the inlet port plate 62 are forcibly discharged through an opening in the outlet port plate 61. The fluid might be channeled through the motor 16 to cool the motor 16.

As the fluid pump 12 is driven by the motor 16, electrostatic charge can build up within the fluid passing through the pump 12. Electrostatic charges discharge through the path of least resistance to a ground. Certain conditions can increase the likelihood that the circuit components are in the path of least resistance to a ground. For example, when the pump 12 is used as a fuel pump, if insulation is positioned between the motor assembly 14 and any outer housing, if the outer housing 18 is plastic, if incoming and outgoing fuel lines are non-conductive, and if the fuel pumped is of relatively low conductivity, one likely path for electrostatic discharge is though the motor windings 34. Any number of electronic components 49 can be in the path of an electrostatic discharge though the body of a pump assembly 10.

One source of the electrostatic charge is fluid flow through the filter media of the filter 63. In the absence of the grounding clip 24, the electrostatic charge might discharge through components of the motor 16, such as the motor windings 34 and MOSFETs 49A and electronic devices 49B that control the MOSFETS 49A. The ESD can cause problems, such as the components temporarily malfunctioning or being permanent damaged. The permanent damage can be produced by a single ESD discharge or as a result (culmination) of multiple ESD discharges over time. ESD might be more likely where the fluid is organic fuel than where the fluid is water. Accordingly, factors that increase ESD problems might be the motor 16 being brushless and having electronic (logic) components, the fluid being pumped, the fluid being filtered, and the fluid being fuel.

The ESD, and the problems it causes, might be overcome by the grounding device 24 providing an electrostatic grounding path from the can 18 to one of the power terminals, such as the ground terminal 21.

Figure 3:
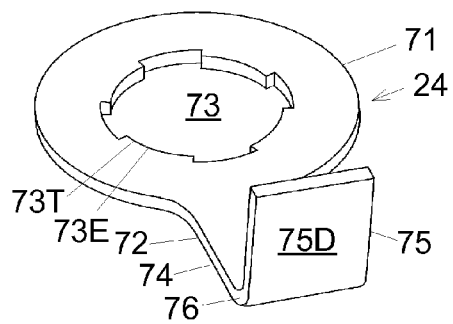
FIG. 3 is a perspective view of grounding device of the pump assembly.
Figure 4:
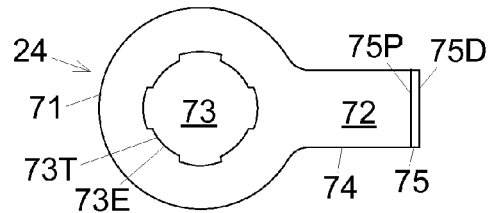
FIG. 4 is a top view top view of the grounding device.

FIGS. 2-4 show an example of the grounding device 24. The grounding device 24 is fabricated from conductive (such as electrostatic dissipative) material, such as copper, brass, steel or graphite. In this example, the grounding device 24 is in the form of a rigid grounding tab. The grounding tab 24 includes a securing structure 71 and a strip 72. The securing structure 71 secures the tab 24 to the ground terminal 21. In this example, the securing structure 71 is in the form of a ring. The ring 71 has a hole 73 that receives the ground terminal 21 as the securing structure 71 is slipped onto (placed about) the ground terminal 21. The hole 73 is defined by a circumferential peripheral edge 73E that includes radially-inwardly projecting teeth 73T that grip the ground terminal 21. The edge 73E can alternatively be smoothly round, without teeth. The strip 72 includes (1) a proximal section 74 that is coplanar with the securing section 71 and (2) a distal section 75 that is bent up from (perpendicular to or substantially perpendicular to) the proximal section 74. In this example, the proximal and distal sections 74, 75 are straight (substantially straight), and meet at a localized bend 76 (elbow) in the strip 72. The distal section 75 has a proximal side surface 75P facing toward the proximal section 74 and a distal side surface 75D facing away from the proximal section 74.

Figure 6:
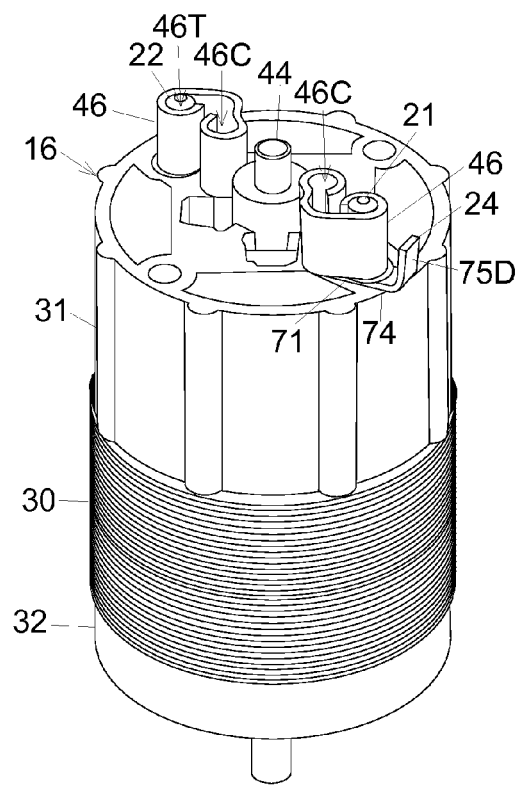
FIG. 6 is a perspective view showing the grounding device installed on the motor.

FIG. 6 shows the grounding device 24 in an installed position on the motor 16. In the tab's installed position, the hole 23 (FIG. 3) of the tab's securing section 71 receives the ground terminal 21. A user may install the tab 24 by (1) removing the jumper strap 46, (2) inserting the ground terminal 21 through the tab's hole 23 (equivalent to placing the tab's securing section 71 around the ground terminal 21), (3) installing the jumper strap 46 back onto the ground terminal 21, and (4) pressing the jumper strap 46 down tightly against the tab 24. A tight friction fit between the jumper strap 46 and the ground terminal 21 keeps the jumper strap 46 tightly in place against the tab 24.

The tab 24 is pressed down by the respective jumper strap 46 and is secured to the ground terminal 21 by the jumper strap 46. The tab 24 might be electrically connected to the ground terminal 21 by either or both of (1) direct (physical) contact between the tab 24 and the ground terminal 21 and (2) direct (physical) contact between the tab 24 and the jumper strap 46. In one example, the tab 24 is secured in place (prevented from withdrawal from the ground terminal 21) only by pressing contact from the jumper strap 46, and not secured by an adhesive or fastener. The tab 24 might be secured in place by the tab's securing section 71 grasping the ground terminal 21.

Figure 5:
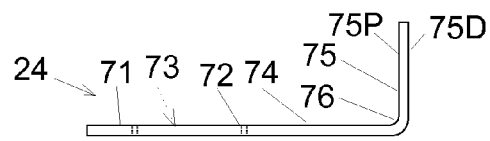
FIG. 5 is a side view of the grounding device.

FIG. 7 shows the tab 24, the pump 12 and a pump connector 80 installed on the motor assembly 14. The tab 24 is shown projecting outward from under the pump 12, with the distal section 75 projecting upward alongside the pump connector 80. The distal section's distal surface 75D faces radially outward. The distal section's proximal surface 75P (FIG. 5) faces radially inward toward the pump 12.

FIG. 8 shows the can 18 installed around, and encasing, the motor 12. In this example, the distal surface 75D of the tab's upturned distal section 75 engages the radially-inwardly facing surface 19 (FIG. 1) of the can 18. In this example, the tab's proximal section 74 does not contact the can 18. The tab 24 provides an electrostatic discharge path from the can 18 to the ground terminal 21. The outer housing 18 would be electrically isolated from the ground terminal 21 if not for the grounding tab 24. The tab's distal section 75 might be squeezed between the motor 16 and the can 18 to be (1) parallel with the can's inner surface 19, (2) deformed to match the curvature of the can's inner surface 19 and (3) in contact with the can's inner surface 19 over a significant portion of the distal section's distal side surface 75D.

In this example, contact between the grounding tab 24 and the can 18 is based on pressing contact of the tab 24 against the can's inner side surface 19, and does not include an adhesive or fastener. Accordingly, in this example, the only resistance that the tab 24 exerts against sliding of the motor 16 into or out of the can 18 is frictional resistance between the tab 24 and the can 18.

The tab's distal section 75 is upturned in an upward direction B, which is a direction in which the housing 18 slides over the motor 16 to receive the motor 16. The tab 24 might be flexibly (bendably) elastic. The elasticity helps the tab 24 retain live contact with the can 18 if the tab 24 or the motor 16 or the can 18 deform such as due to age, heat or vibration. The tab 24 is more likely to retain (less likely to lose) contact with the can 18 if the tab 24 is bent (upturned) than if the tab 24 were unbent, since the upturn functions as a cantilever spring. The bend in the tab's strip 72 might yield greater surface area of contact with the can 18 than if the tab's strip 72 were not bent. As the can 18 is slid over the motor 16, the tab 24 is less likely to catch (be caught onto) a nick, edge or surface imperfection of the can 18 if the tab's distal end 75 projects upward than if the distal end 75 would project downward. That is because, the can 18 will slide up and over the tab's elbow 76.

In different examples, the power terminal 21 that the grounding tab 24 is secured to might be a ground terminal (whereas the other power terminal 22 might be a "supply" terminal), or might be a negative terminal (whereas the other terminal 22 might be a positive terminal that is at a more positive voltage than the negative terminal), or might be a neutral terminal (whereas the other terminal might be a "hot" terminal), or might be a positive terminal (whereas the other terminal 22 might be a negative terminal that is at a more negative voltage than the positive terminal).

One criteria that can be considered when the ground terminal 21 is designed and a material chosen is to generally minimize or eliminate galvanic corrosion. Alternatively, if galvanic corrosion cannot be eliminated or avoided, the grounding tab 24 can be designed so that the galvanic corrosion generally occurs on the ground terminal. The grounding tab 24 can be designed to be inexpensive to produce and more readily replaceable than a terminal 21, 22.

Although the above examples include a ground terminal that is secured to a terminal of a motor assembly, the ground terminal can alternatively be placed in contact with other parts of the motor assembly. For example, if a motor assembly experiences electrostatic buildup at a certain area or location within the motor assembly, the ground terminal can be positioned to be in electrical communication with such an area or location to more readily form a desired discharge path for the electrostatic charge.

The arrangements of the BLDC motor assembly 14, ground terminal 21, and outer housing 18 as described herein can provide electrostatic charge a path to discharge through the ground terminal 21 and outer housing 18, so that electronic components such as MOSFETS within the BLDC motor assembly 10 can be protected against damage from electrostatic discharge.

The components and processes described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by a substantially equivalent term enclosed in parentheses.

The invention claimed is:

1. An apparatus comprising:
    a motor including:
        a rotor assembly including a rotor and a motor shaft secured to the rotor,
        stator coils,
        circuitry that includes electronic components that cooperatively operate to activate and deactivate the coils in a manner that causes the rotor assembly to rotate, and
        first and second power terminals;
    an electrically conductive outer housing that surrounds the motor; and
    an electrically conductive grounding tab that is electrically connected to the first power terminal and that contacts an inwardly-facing surface of the outer housing to provide a electrostatic discharge path from the outer housing to the first power terminal, wherein the grounding tab includes a securing structure and a strip, wherein the securing structure receives the first power terminal, wherein the strip includes a proximal section that is coplanar with the securing structure and an upturned distal section that is substantially perpendicular to the proximal section, and wherein the upturned distal section of the strip pressingly contacts the inwardly-facing surface of the outer housing.

2. The apparatus of claim 1, wherein the proximal section does not contact the outer housing.

3. The apparatus of claim 1, wherein the distal section is upturned in a direction in which the housing is configured to slide when being slid over the motor to receive the motor.

4. The apparatus of claim 1, wherein the proximal section and the distal section are substantially straight and meet at a localized bend in the strip.

5. The apparatus of claim 1, wherein the grounding tab is not coupled to the outer housing by an adhesive or a fastener.

6. The apparatus of claim 1, wherein the outer housing has a top opening and is configured for the motor to be slid into the outer housing through the top opening.

7. The apparatus of claim 1, wherein the only resistance that the tab exerts against sliding of the motor into or out of the outer housing is frictional resistance between the tab and the outer housing.

8. The apparatus of claim 1, further comprising a jumper strap that includes (i) a terminal-grasping section that grasps the first power terminal and (ii) a cable-grasping section that grasps an conductor of a power cable, wherein the jumper strap presses down on the tab and electrically couples the tab to the first power terminal.

9. The apparatus of claim 8, wherein the tab is secured in place only by pressing contact from the jumper strap.

10. The apparatus of claim 1, wherein the tab is secured in place by the tab grasping the first power terminal.

11. The apparatus of claim 1, wherein the tab is not secured in place by an adhesive or fastener.

12. The apparatus of claim 1, wherein the first terminal projects, from the motor, rigidly upward.

13. The apparatus of claim 1, wherein the first power terminal is a ground terminal and the second power terminal is a supply terminal.

14. The apparatus of claim 1, wherein the first power terminal is a negative terminal and the second power terminal is a positive terminal.

15. The apparatus of claim 1, wherein the first power terminal is a positive terminal and the second power terminal is a negative terminal.

16. The apparatus of claim 1, wherein the motor is a brushless motor, and the electronic components include a field effect transistor.

17. The apparatus of claim 1, wherein the apparatus includes a fluid filter and a fluid pump, wherein the fluid pump is attached to the motor and is driven by the motor shaft.

18. The apparatus of claim 17, wherein the fluid pump is a fuel pump and the filter is fuel filter.

19. An apparatus comprising:
a motor including:
a rotor assembly including a rotor and a motor shaft secured to the rotor,
stator coils,
circuitry that includes electronic components that cooperatively operate to activate and deactivate the coils in a manner that causes the rotor assembly to rotate, and
first and second power terminals;
an electrically conductive outer housing that surrounds the motor;
an electrically conductive grounding tab that is electrically connected to the first power terminal and that contacts an inwardly-facing surface of the outer housing to provide a electrostatic discharge path from the outer housing to the first power terminal; and
a jumper strap that includes (i) a terminal-grasping section that grasps the first power terminal and (ii) a cable-grasping section that grasps an conductor of a power cable, wherein the jumper strap presses down on the tab and electrically couples the tab to the first power terminal.

20. The apparatus of claim 19, wherein the grounding tab includes a securing structure and a strip, wherein the securing structure receives the first power terminal, and wherein the strip pressingly contacts the inwardly-facing surface of the outer housing.

21. The apparatus of claim 19, wherein the outer housing has a top opening and is configured for the motor to be slid into the outer housing through the top opening.

22. The apparatus of claim 19, wherein the only resistance that the tab exerts against sliding of the motor into or out of the outer housing is frictional resistance between the tab and the outer housing.

23. The apparatus of claim 19, wherein the tab is secured in place only by pressing contact from the jumper strap.

* * * * *